United States Patent
Bracha

(10) Patent No.: US 6,725,280 B1
(45) Date of Patent: Apr. 20, 2004

(54) METHOD AND APPARATUS FOR CONSTRUCTING DISPATCH TABLES WHICH ENABLE TRANSITIVE METHOD OVERRIDE

(75) Inventor: Gilad Bracha, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/374,879

(22) Filed: Aug. 13, 1999

(51) Int. Cl.[7] .................................................. G06F 9/44
(52) U.S. Cl. ....................................... 709/315; 717/141
(58) Field of Search ................................... 709/315, 141

(56) References Cited

U.S. PATENT DOCUMENTS

| | | | | |
|---|---|---|---|---|
| 5,327,562 A | * | 7/1994 | Adcock ....................... 717/141 |
| 5,404,525 A | * | 4/1995 | Endicott et al. ............ 717/108 |
| 5,632,034 A | | 5/1997 | O'Farrell ..................... 395/701 |
| 5,721,824 A | | 2/1998 | Taylor .................... 395/200.33 |
| 5,913,064 A | | 6/1999 | Chen ........................... 395/702 |
| 5,918,052 A | * | 6/1999 | Kruskal et al. ............. 717/100 |
| 6,102,966 A | | 8/2000 | Tyma ............................. 717/1 |

OTHER PUBLICATIONS

First Edition of JLS entitled "The Java Language Specification", by James Gosling, Bill Joy & Guy Steele, dated Oct. 3, 2002, (40 pgs.), http://java.sun.com/docs/books/jls/first_edition/html/index.html.

Cardelli et al., "Modula–3 Report (revised)," digital Systems Research Center, Nov. 1, 1989.

* cited by examiner

Primary Examiner—Sue Lao
Assistant Examiner—LeChi Truong
(74) Attorney, Agent, or Firm—Hickman Palermo Truong & Becker LLP; Christian A. Nicholes; Bobby K. Truong

(57) ABSTRACT

A mechanism is disclosed for constructing dispatch tables which enable transitive method override. A dispatch table for a class C (wherein C is within a package P and is a subclass of superclass S) is constructed as follows. First, the S dispatch table is copied and is used as the starting point for the C dispatch table. Then, for each locally declared method m in C, the method m is checked to determine whether it has been marked public/protected. If so, then the S dispatch table is checked for a public/protected entry corresponding to a method having the same name as method m. If such an entry is found, then the corresponding entry in the C dispatch table is overridden. Otherwise, a new entry is allocated in the C dispatch table and is marked public/protected. In addition, the S dispatch table is checked for a package private (private to package P) entry corresponding to a method having the same name as method m. If such an entry is found, then the corresponding entry in the C dispatch table is overridden and is marked public/protected. If, on the other hand, the method m is marked package private, then the S dispatch table is checked for a package private entry (private to package P) corresponding to a method having the same name as method m. If such an entry is found, then the corresponding entry in the C dispatch table is overridden. Otherwise, a new entry is allocated in the C dispatch table and is marked package private. In addition, the S dispatch table is checked for a public/protected entry corresponding to a method having the same name as method m. If such an entry is found, then the corresponding entry in the C dispatch table is overridden, but that entry's public/protected marking is maintained. Constructed in this manner, the C dispatch table will support transitive method override.

39 Claims, 9 Drawing Sheets

PACKAGE P1

PUBLIC CLASS A

M1 (PACKAGE PRIVATE)
        •
        •
        •

PACKAGE P2

PUBLIC CLASS B EXTENDS A

M1 (PUBLIC/PROTECTED)
        •
        •
        •

*Fig. 1*

PACKAGE P1

PUBLIC CLASS A

M1 (PACKAGE PRIVATE)

PUBLIC CLASS B EXTENDS A

•  M1 (PUBLIC/PROTECTED)
        •
        •

PACKAGE P2

PUBLIC CLASS C EXTENDS B

M1 (PUBLIC/PROTECTED)
        •
        •
        •

*Fig. 2*

SUPER CLASS S
S METHOD TABLE

| METHOD NAME | CLASS POINTER | ACCESSIBILITY | DISPATCH TABLE INDEX | CODE POINTER |
|---|---|---|---|---|
| M1 | PS | ... | 1 | CP1 |
| M2 | PS | ... | 2 | CP2 |
| M3 | PS | ... | 3 | CP3 |
| ... | ... | ... | ... | ... |

S DISPATCH TABLE

| METHOD POINTER | ACCESSIBILITY | CODE POINTER |
|---|---|---|
| MT1 | ... | CP1 |
| MT2 | ... | CP2 |
| MT3 | ... | CP3 |
| ... | ... | |

SUBCLASS C IN PACKAGE P
C METHOD TABLE

| METHOD NAME | CLASS POINTER | ACCESSIBILITY | DISPATCH TABLE INDEX | CODE POINTER |
|---|---|---|---|---|
| M1 | PC | ... | | ... |
| ... | ... | ... | ... | ... |

C DISPATCH TABLE

| METHOD POINTER | ACCESSIBILITY | CODE POINTER |
|---|---|---|
| MT1 | ... | CP1 |
| MT2 | ... | CP2 |
| MT3 | ... | CP3 |
| | | |

Fig. 4

METHOD AND APPARATUS FOR CONSTRUCTING DISPATCH TABLES WHICH ENABLE TRANSITIVE METHOD OVERRIDE

BACKGROUND

This invention relates generally to computer systems and more particularly to a method and apparatus for constructing dispatch tables which enable transitive method override.

Inheritance is a major property of most object oriented programming systems. With inheritance, when a class is declared as a subclass of a superclass, that subclass automatically inherits all of the methods and attributes of the superclass. Thus, if class A has method M1 and attribute AT1, then class B, which is a subclass of class A, automatically inherits method M1 and attribute AT1. In addition to inheriting the methods and attributes of the superclass, the subclass may further comprise additional methods and attributes. Thus, for the example given above, class B may further comprise methods M2 and M3, and attributes AT2 and AT3.

In addition to inheriting and adding methods and attributes, some object oriented systems further allow subclasses to override the methods of the superclass. That is, the subclass is allowed to provide an implementation for an inherited method which is different from that provided by the superclass. This means that, for the example given above, subclass B may provide a different implementation for method M1 than that provided by superclass A. For example, the implementation for M1 provided by superclass A may draw a square whereas the implementation for method M1 provided by subclass B draws a circle. Thus, even though both methods have the same name, they may have different implementations. Which implementation is invoked depends upon the class of the object instance on which the method is invoked. If the method is invoked on a class A instance, then the implementation provided by class A will be invoked. If the method is invoked on a class B instance, then the implementation provided by class B will be invoked. Because there may be multiple implementations for any particular method, a determination will have to be made at runtime as to which implementation to invoke. The process of selecting which implementation to invoke at runtime is referred to as dynamic method dispatch.

In single inheritance systems where every subclass is able to access, and hence, override every method of a higher level class, the dynamic method dispatch process is relatively straightforward. However, some systems, such as the Java™ programming system manufactured by Sun Microsystems, Inc. of Mountain View, Calif., implement constructs known as "modularity constructs" which make it possible for a developer to restrict the accessibility of certain methods of certain classes to other classes. In the face of these accessibility restrictions, dynamic method dispatch is made much more complicated.

To elaborate, a modularity construct, sometimes referred to as a "package" in Java™, provides a mechanism for grouping or encapsulating selected classes. The package construct makes it possible to limit access to the classes within a package by classes in other packages. More specifically, each method of each class within a package may be declared as "public", "protected", or "package private". If a method is declared public or protected (denoted as public/protected hereinafter), then it may be accessed, and hence overridden, by any subclass of that class. On the other hand, if a method is declared package private, then that method may be accessed and overridden by a subclass if and only if that subclass is within the same package. Subclasses outside the package may not access or override the method. FIG. 1 illustrates an example of such a situation. In FIG. 1, there is shown two packages, P1 and P2. Package P1 contains a class A having a package private method M1. package P2 contains a class B which extends A (meaning that B is a subclass of A) having a public/protected method M1. Because method M1 of class A is declared package private, and because class B is not in the same package as class A, class B will not be able to access or to override the method M1 of class A. Note that the package construct does not prevent class B from being a subclass of A, and hence, inheriting all of the attributes and methods of class A. The package only prevents class B from overriding the method M1 of class A. To enforce package constraints, it is a general rule that unless a subclass is within the same package as a higher level class that it wishes to override, it cannot override a package private method of the higher level class.

While on the surface, this general rule appears to effectively enforce the accessibility constraints imposed by modularity constructs, it can lead to some undesirable results, one of which is that of non-transitive method override. To illustrate how this non-transitive result can arise, suppose that a structure such as that shown in FIG. 2 is created, wherein there are two packages, P1 and P2. In package P1, there is a class A having a package private method M1. In the same package, there is a subclass B which extends A, having a public/protected method M1. In package P2, there is a subclass C which extends B, and which has a public/protected method M1. With such a structure, it is clear that method M1 of subclass B can access and hence override method M1 of class A (since B is in the same package as A). It is also clear that method M1 of class C can override the method M1 of class B (since method M1 of B is declared to be public/protected). According to the transitive property, if method M1 of C can override method M1 of B, and method M1 of B can override method M1 of A, then method M1 of C should be able to override method M1 of A. This is not the result in this example, however, because under the rule set forth above, M1 of C cannot override M1 of A because M1 of A is package private and C is not in the same package as A. Thus, as this example shows, strict adherence to this rule can lead to non-transitive results. Because this is a somewhat non-intuitive result, and because transitive method override is a desirable property, there is a need for an improved dynamic method dispatch mechanism which is both capable of enforcing the accessibility constraints of modular constructs and providing transitive method override.

SUMMARY OF THE INVENTION

The present invention provides a mechanism for constructing dispatch tables which may be used to perform dynamic method dispatch in a single inheritance system. As constructed, the dispatch tables enforce accessibility constraints imposed by modularity constructs while at the same time enabling transitive method override. According to one embodiment, a dispatch table for a class C (wherein C is within a package P and is a subclass of superclass S) is constructed as follows. First, the dispatch table for S is copied and is used as the starting point for the dispatch table of C. Then, for each locally declared method m in C, the following is performed.

The method m is checked to determine whether it has been marked as public/protected. If so, then the S dispatch table is checked for one or more public/protected entries corresponding to a method having the same name as method m. If one or more such entries is found, then for each such entry, the corresponding entry in the C dispatch table is overridden, and the index of the overridden entry is associated with method m. Otherwise, a new entry is allocated in the C dispatch table and is marked public/protected. Then, the index of the new entry is associated with method m. In addition, the S dispatch table is checked for one or more package private (private to package P) entries corresponding to a method having the same name as method m. If one or more such entries is found, then for each such entry, the corresponding entry in the C dispatch table is overridden and is marked public/protected.

If, on the other hand, the method m is marked as package private, then the S dispatch table is checked for one or more package private entries (private to package P) corresponding to a method having the same name as method m. If one or more such entries is found, then for each such entry, the corresponding entry in the C dispatch table is overridden, and the index of the overridden entry is associated with method m. Otherwise, a new entry is allocated in the C dispatch table and is marked package private. Then, the index of the new entry is associated with method m. In addition, the S dispatch table is checked for one or more public/protected entries corresponding to a method having the same name as method m. If one or more such entries is found, then for each such entry, the corresponding entry in the C dispatch table is overridden. However, that entry's public/protected marking is maintained.

The above method is repeated for each method m of class C. Once all methods of class C have been processed, the dispatch table for class C will have been fully constructed. Constructed in the manner described, the dispatch table will support transitive method override.

BRIEF DESCRIPTION OF THE DRAWINGS

FIG. 1 is a diagram of two classes within two packages to illustrate the accessibility constraints that may be imposed by modularity constructs.

FIG. 2 is a diagram of three classes within two packages to illustrate how enforcement of modularity constraints may cause method override to be non-transitive.

FIG. 4 shows sample method tables and dispatch tables for a superclass S and a subclass C to illustrate the process of constructing a dispatch table for subclass C in accordance with the present invention.

DETAILED DESCRIPTION OF THE EMBODIMENT(S)

Before describing the invention in detail, a short discussion of dispatch tables will be provided in order to facilitate a complete understanding of the invention. In a system in which dispatch tables are used to perform dynamic method dispatch, there is associated with each class a method table and a dispatch table. The method table sets forth all of the methods associated with the class, while the dispatch table contains pointers to the sets of code that implement the methods. The method table is used to construct the dispatch table, and once constructed, the dispatch table is used at runtime to perform dynamic method dispatch. The purpose of the dispatch table is to increase system efficiency at runtime.

Figure 3:
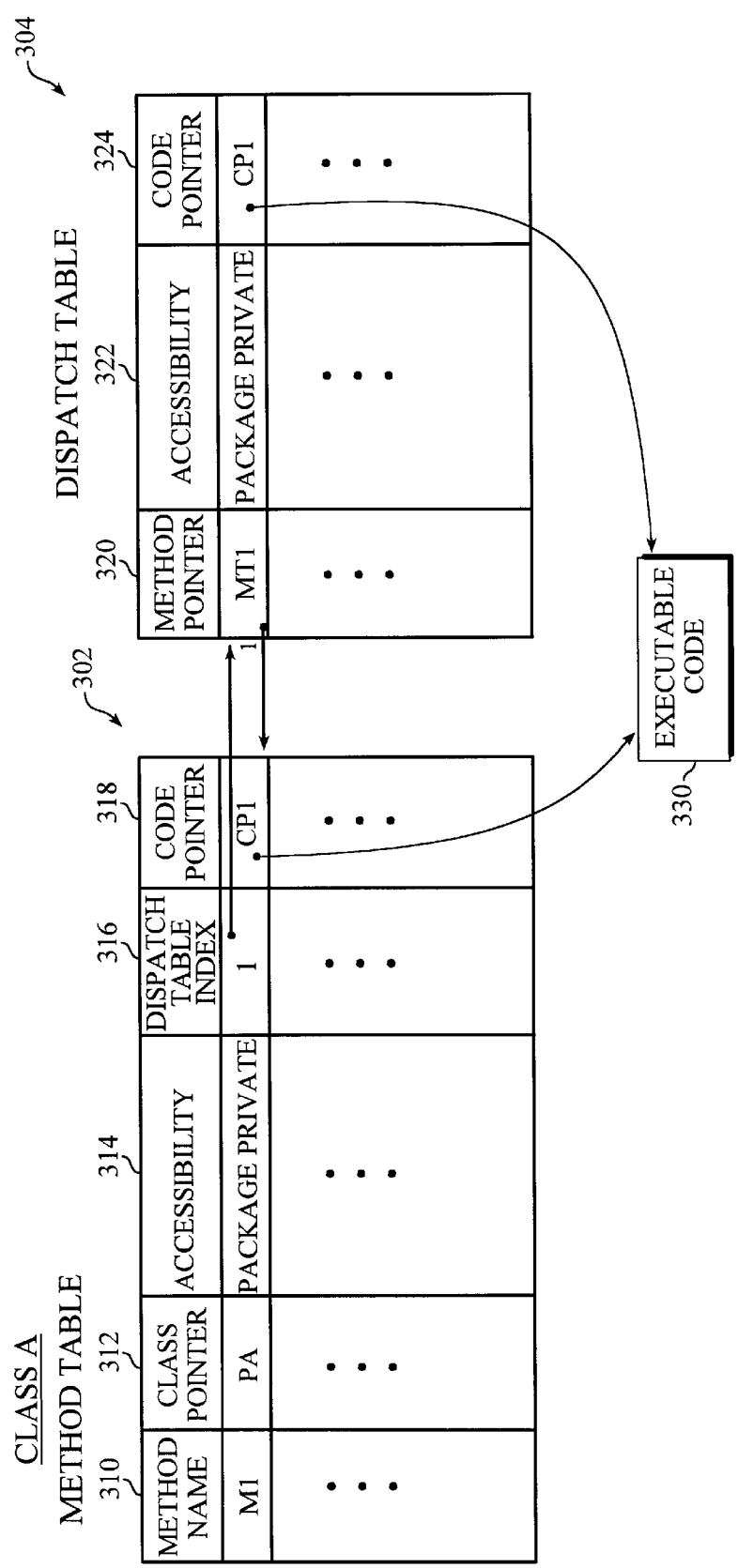
FIG. 3 shows a sample method table and dispatch table for a class A comprising a method M1.

With reference to FIG. 3, there is shown a sample method table 302 and dispatch table 304 for a class A comprising a method M1. As shown, the method table 302 comprises five columns. The method name column 310 stores the name of the method. The class pointer column 312 stores a pointer which points back to the class definition. This pointer is useful for going back to the class definition to ascertain more information regarding the class. The accessibility column 314 stores the accessibility code (e.g. public, protected, package private) associated with the method. The dispatch table index column 316 stores the index of the entry in the dispatch table which is associated with a particular method, and the code pointer column 318 stores a pointer to a set of executable code which implements the method. For each method in class A, there is an associated entry in the method table 302. In the current example, class A has a method M1. Thus, there is an entry in the method table 302 having M1 in the name column 310. This entry has a class pointer PA which points back to the class definition for class A, and a package private accessibility code, indicating that the method M1 is package private. The entry further has a dispatch table index of 1, indicating that the entry in the dispatch table 304 which is associated with method M1 is the first entry. The entry further has a code pointer CP1 which points to a set of executable code 330 which implements method M1.

The dispatch table 304 comprises three columns. The method pointer column 320 stores a pointer back to the entry in the method table 302 with which an entry in the dispatch table is associated. This pointer enables navigation back and forth between the tables. The accessibility column 322 stores an accessibility code (e.g. public, protected, package private) associated with the dispatch table entry, and the code pointer column 324 stores a pointer to a set of executable code. There is at least one entry in the dispatch table 304 for each entry in the method table 302. In the current example, there is an entry in the method table 302 for method M1; thus, there is a corresponding entry in the dispatch table 304. This dispatch table entry has a pointer MT1 which points back to the corresponding entry in the method table. The dispatch table entry further has a package private code stored in the accessibility column 322. In addition, the dispatch table entry has a code pointer CP1 which points to the set of executable code 330. With the dispatch table 304 set up in the manner shown, it is code 330 that will be executed when method M1 is invoked on an instance of class A. Once a dispatch table 304 is constructed, it may be used at runtime to perform dynamic method dispatch to execute the proper set of code in response to a method invocation. To perform dynamic method dispatch, it is not necessary to reference the method table 302. This optimizes the efficiency of the dispatch process.

Figure 5A:
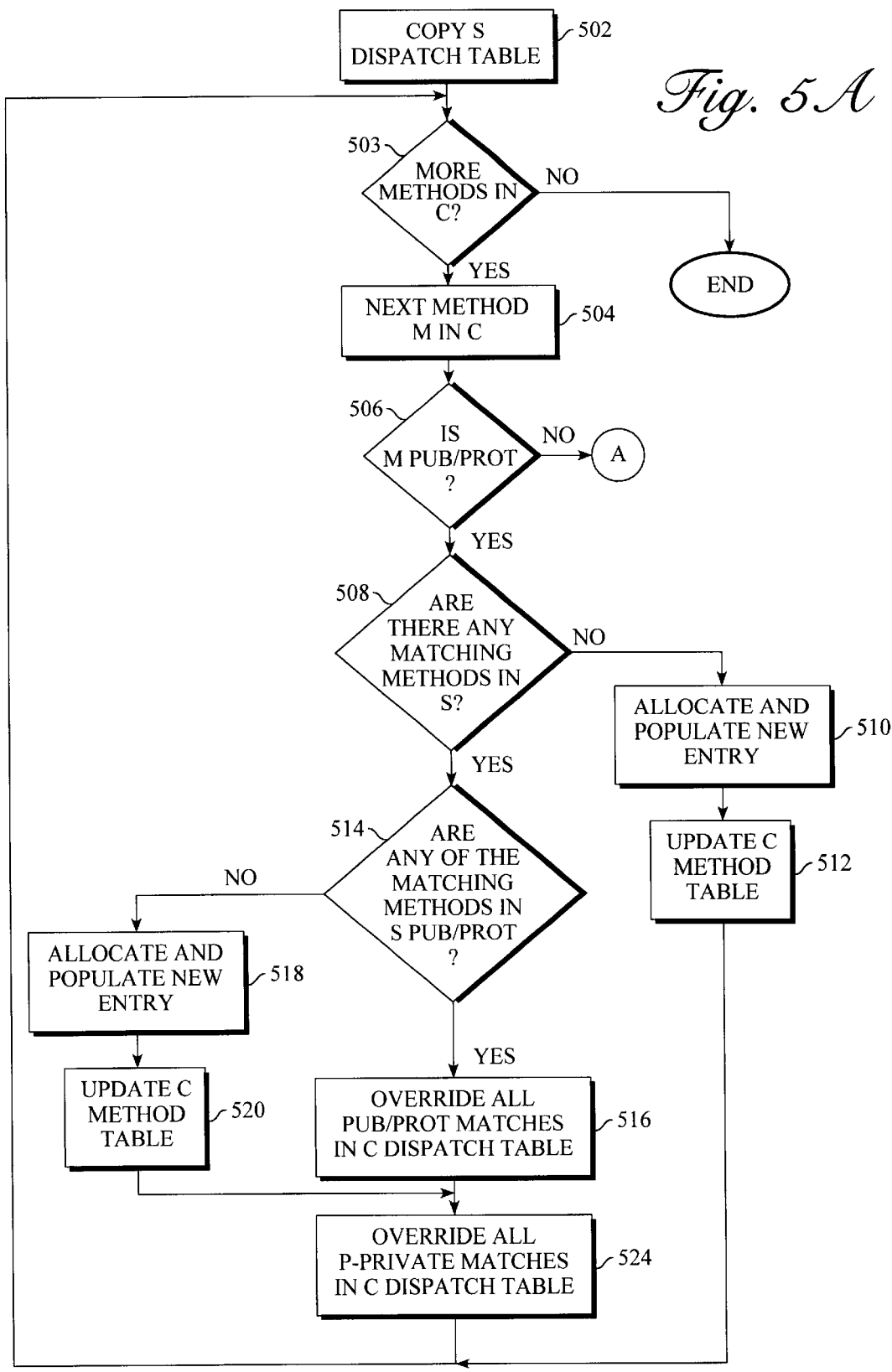
FIGS. 5a and 5b are flow diagrams for a first embodiment of the present invention.
Figure 5B:
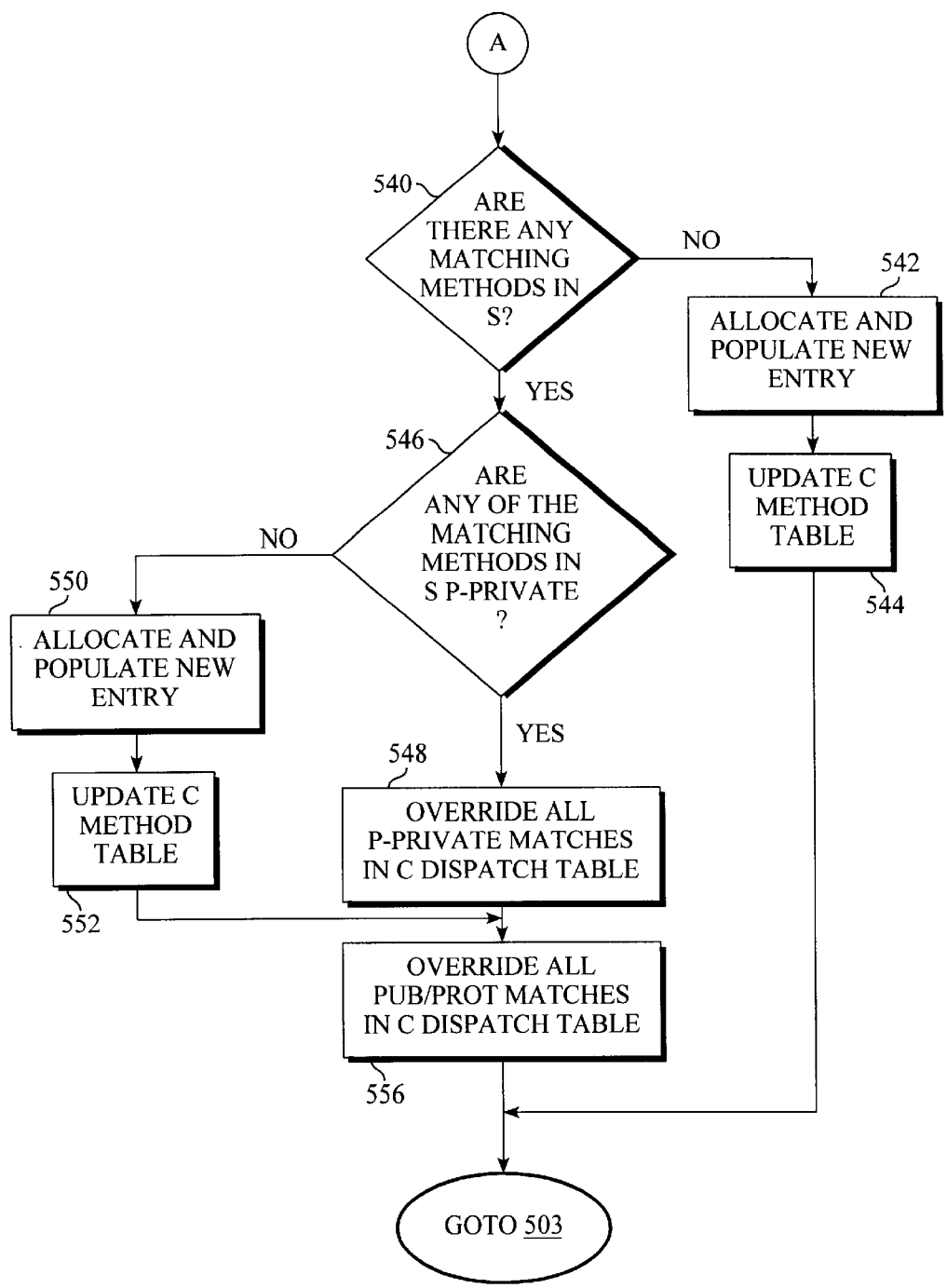

With this background information in mind, the dispatch table construction method of the present invention will now be described. The following description is based upon the following assumptions: (1) the dispatch table being constructed is for a class C; (2) C has an associated preconstructed method table having stored therein an entry for each method m in C; (3) C is a part of package P; (4) C is a subclass of superclass S; and (5) S has a preconstructed method table and dispatch table associated therewith. To facilitate discussion of the invention, reference will be made to FIGS. 4, 5*a*, and 5*b*. FIG. 4 shows sample method and dispatch tables for superclass S and subclass C as the dispatch table construction process begins. FIGS. 5*a* and 5*b* are the flow diagrams for a first embodiment of the method of the present invention.

As shown in FIG. 5*a*, construction of the C dispatch table 444 begins with copying (502) the S dispatch table 404 and using that as a starting point for the C dispatch table 444. This is shown in FIG. 4, wherein dispatch table 444 is depicted as being identical to dispatch table 404. Once that is done, a determination (503) is made as to whether there are any more methods in the C method table 442. If not, then it means that all of the methods of C have been processed, in which case, the dispatch table construction process is terminated. However, if there are more methods in the C method table 442, then the next entry 468 in the method table 442 corresponding to the next method m is selected (504). At this point, it should be noted that "im", as used in the following discussion, is not the specific name of a method, but rather is used as a variable to refer to any method entry in the C method table 442.

Once the next method m entry 468 is selected, the following procedure is performed. This procedure is performed for each method m in the C method table 442. Initially, the selected entry 468 is checked (506) to determine whether it has been marked in the accessibility column 454 as being public/protected. If it has not, then the method of the present invention proceeds to entry point A (shown in FIG. 5*b*), which will be discussed in a later section. On the other hand, if the entry has been marked as public/protected, then a check is made to determine (508) whether there are any entries in the S dispatch table 404 which correspond to a method of S having the same name as method m. This may be done by following each pointer in the method pointer column 420 of S dispatch table 404 back to the S method table 402, and determining whether the name in the method name column 410 matches the name of the method m.

If no such entry is found, then a new entry 470 is allocated (510) in the C dispatch table 444, and the new entry 470 is populated (510). Specifically, the new entry 470 is populated by: (1) marking the accessibility column 462 of the entry 470 with public/protected; (2) storing a pointer in the method pointer column 460 of the entry 470 which points to the method m entry 468 of the C method table; and (3) storing the code pointer found in the code pointer column 458 of the method m entry 468 of the C method table 442 into the code pointer column 464 of the new entry 470. Once that is done, the C method table 442 is updated (512). Table 442 is updated by writing the index of the newly allocated entry 470 into the dispatch table index column 456 of the method m entry 468. In the example shown in FIG. 4, the index of the new entry is "4"; thus, "4" will be written into column 456 of entry 468. The process then loops back to (503) to process another method m.

Returning to (508), if one or more entries (referred to herein as matching entries) is found in the S dispatch table 404 which corresponds to a method of S having the same name as method m, then a determination (514) is made as to whether any of the matching entries is marked public/protected in the accessibility column 422 of the S dispatch table 404. If none of the matching entries is marked public/protected, then a new entry 470 is allocated (518) in the C dispatch table 444, and the new entry 470 is populated (518). The new entry 470 is populated by: (1) marking the accessibility column 462 of the entry 470 with public/protected; (2) storing a pointer in the method pointer column 460 of the entry 470 which points to the method m entry 468 of the C method table; and (3) storing the code pointer found in the code pointer column 458 of the method m entry 468 of the C method table 442 into the code pointer column 464 of the new entry 470. Once that is done, the C method table 442 is updated (520). Table 442 is updated by writing the index of the newly allocated entry 470 into the dispatch table index column 456 of the method m entry 468. In the example shown in FIG. 4, the index of the new entry is "4"; thus, "4" will be written into column 456 of entry 468. The process then proceeds to (524).

Returning to (514), if it is determined that one or more of the matching entries is marked public/protected, then for each matching entry in the S dispatch table 404 that is marked public/protected, a corresponding entry in the C dispatch table 444 is overridden (516). For the sake of illustration, suppose that entry 426 of the S dispatch table 404 is a matching entry that has been marked as public/protected. In such a case, the corresponding entry 466 in the C dispatch table 444 (the entry having the same index as entry 426) is overridden (516). The entry 466 is overridden by: (1) marking the accessibility column 462 of the entry 466 with public/protected; (2) storing into the method pointer column 460 of the entry 466 a pointer pointing to the method m entry 468 of the C method table; and (3) storing into the code pointer column 464 of the entry 466 the code pointer found in the code pointer column 458 of the method m entry 468. In addition, the method m entry 468 in the C method table 442 is updated. This entry 468 is updated by writing the index of the newly overridden entry 466 into the dispatch table index column 456 of the method m entry 468. In the example shown in FIG. 4, the index of the overridden entry is "1"; thus, "1" will be written into column 456 of entry 468. The corresponding entry 466 in the C dispatch table 444 is thus overridden. The overriding process described above is performed for each matching entry marked as public/protected.

Thereafter, the process proceeds to (524) to override all matching entries that have been marked as private to package P (the package to which class C belongs). That is, for each matching entry in the S dispatch table 404 that is marked private to package P (if any), a corresponding entry in the C dispatch table 444 is overridden (524). To determine whether a matching entry in the S dispatch table 404 is private to package P, the accessibility column 422 of the matching entry is first checked to see if the entry has been marked package private. If not, then the entry cannot be private to package P. However, if the entry is marked package private, then the method pointer in the method pointer column 420 of the entry is followed to an entry in the S method table 402. From there, the class pointer PS can be obtained from the class pointer column 412. Using this pointer, the class definition for class S can be reached, and from the class definition, it can be ascertained whether class S is part of package P. If class S is part of package P, then the matching entry is private to package P.

If one or more matching entries in the S dispatch table 404 is found to be private to package P (i.e. is P-private), then for each P-private matching entry, a corresponding entry in the C dispatch table 444 is overridden (524). For the sake of illustration, suppose that entry 426 of the S dispatch table 404 is a matching entry that has been determined to be P-private. In such a case, the corresponding entry 466 in the C dispatch table 444 (the entry having the same index as entry 426) is overridden (524). The entry 466 is overridden by: (1) marking the accessibility column 462 of the entry 466 with public/protected; (2) storing into the method pointer column 460 of the entry 466 a pointer pointing to the method m entry 468 of the C method table; and (3) storing into the code pointer column 464 of the entry 466 the code pointer found in the code pointer column 458 of the method m entry 468. This overriding process is performed for each P-private matching entry.

Once all P-private matching entries have been overridden (524), the process loops back to process another method m in the C method table 442. This loop continues until all of the methods of the C method table 442 have been processed, at which point, the C dispatch table 444 is fully constructed, and the construction process is terminated.

Returning to (506), if the method m entry 468 in the C method table 442 is not marked as public/protected (thereby meaning that method m is private to package P), then the method of the present invention branches to entry point A (shown in FIG. 5b). After the branch occurs, a check is made to determine (540) whether there are any entries in the S dispatch table 404 which correspond to a method of S having the same name as method m. This may be done by following each pointer in the method pointer column 420 of S dispatch table 404 back to the S method table 402, and determining whether the name in the method name column 410 matches the name of the method m.

If no such entry is found, then a new entry 470 is allocated (542) in the C dispatch table 444, and the new entry 470 is populated (542). Specifically, the new entry 470 is populated by: (1) marking the accessibility column 462 of the entry 470 with package private; (2) storing a pointer in the method pointer column 460 of the entry 470 which points to the method m entry 468 of the C method table; and (3) storing the code pointer found in the code pointer column 458 of the method m entry 468 of the C method table 442 into the code pointer column 464 of the new entry 470. Once that is done, the C method table 442 is updated (544). Table 442 is updated by writing the index of the newly allocated entry 470 into the dispatch table index column 456 of the method m entry 468. In the example shown in FIG. 4, the index of the new entry is "4"; thus, "4" will be written into column 456 of entry 468. The process then loops back to (503) to process another method m.

Returning to (540), if one or more entries (referred to below as matching entries) is found in the S dispatch table 404 which corresponds to a method of S having the same name as method m, then a determination (546) is made as to whether any of the matching entries is private to package P. To determine whether a matching entry in the S dispatch table 404 is private to package P, the accessibility column 422 of the matching entry is checked to see if the entry has been marked package private. If not, then the entry cannot be private to package P. However, if the entry is marked package private, then the method pointer in the method pointer column 420 of the entry is followed to an entry in the S method table 402. From there, the class pointer PS can be obtained from the class pointer column 412. Using this pointer, the class definition for class S can be reached, and from the class definition, it can be ascertained whether class S is part of package P. If class S is part of package P, then the matching entry is private to package P.

If none of the matching entries is private to package P (i.e. P-private), then a new entry 470 is allocated (550) in the C dispatch table 444, and the new entry 470 is populated (550). The new entry 470 is populated by: (1) marking the accessibility column 462 of the entry 470 with package private; (2) storing a pointer in the method pointer column 460 of the entry 470 which points to the method m entry 468 of the C method table; and (3) storing the code pointer found in the code pointer column 458 of the method m entry 468 of the C method table 442 into the code pointer column 464 of the new entry 470. The C method table 442 is then updated by writing the index of the newly allocated entry 470 into the dispatch table index column 456 of the method m entry 468. In the example shown in FIG. 4, the index of the new entry is "4"; thus, "4" will be written into column 456 of entry 468. The process thereafter proceeds to (556).

Returning to (546), if it is determined that one or more of the matching entries is P-private, then for each P-private entry, a corresponding entry in the C dispatch table 444 is overridden (548). For the sake of illustration, suppose that entry 426 of the S dispatch table 404 is a P-private matching entry. In such a case, the corresponding entry 466 in the C dispatch table (the entry having the same index as entry 426) is overridden (548). The entry 466 is overridden by: (1) maintaining the accessibility column 462 of the entry 466 as package private; (2) storing into the method pointer column 460 of the entry 466 a pointer pointing to the method m entry 468 of the C method table; and (3) storing into the code pointer column 464 of the entry 466 the code pointer found in the code pointer column 458 of the method m entry 468. In addition, the method m entry 468 in the C method table 442 is updated. This entry 468 is updated by writing the index of the newly overridden entry 466 into the dispatch table index column 456 of the method m entry 468. In the example shown in FIG. 4, the index of the overridden entry is "1"; thus, "1" will be written into column 456 of entry 468. The corresponding entry 466 of the C dispatch table 444 is thus overridden. This overriding process is performed for each P-private matching entry.

Thereafter, the process proceeds to (556) to override all matching entries that have been marked as public/protected. That is, for each matching entry in the S dispatch table 404 that is marked public/protected (if any), a corresponding entry in the C dispatch table 444 is overridden (556). To determine whether a matching entry in the S dispatch table 404 is public/protected, the accessibility column 422 of the entry is checked for a public/protected marking.

If one or more matching entries in the S dispatch table 404 is determined to be public/protected, then for each public/protected matching entry, a corresponding entry in the C dispatch table 444 is overridden (556). For the sake of illustration, suppose that entry 426 of the S dispatch table 404 is a matching entry that has been marked public/protected. In such a case, the corresponding entry 466 in the C dispatch table 444 (the entry with the same index as entry 426) is overridden (556). The entry 466 is overridden by: (1) maintaining the accessibility column 462 of the entry 466 as public/protected; (2) storing into the method pointer column 460 of the entry 466 a pointer pointing to the method m entry 468 of the C method table; and (3) storing into the code pointer column 464 of the entry 466 the code pointer found in the code pointer column 458 of the method m entry 468. This overriding process is performed for each matching entry that is marked public/protected.

Once all public/protected matching entries have been overridden (556), the process loops back to process another method m in the C method table 442. This loop continues until all of the methods of the C method table 442 have been processed. Once that is done, the C dispatch table 444 is fully constructed, and the construction process is terminated.

The method disclosed above produces dispatch tables which enable transitive method override. To illustrate that this is indeed the case, reference will be made to FIG. 6, wherein there is shown a plurality of dispatch tables 604, 608, 612 constructed in accordance with the method of the present invention. The tables 602–612 of FIG. 6 correspond to the classes A, B, C of FIG. 2. Namely, the A dispatch table 604 is the dispatch table for class A in package P1. The B dispatch table 608 is the dispatch table for class B in package P1, and the C dispatch table 612 is the dispatch table for class C in package P2. The accessibility constraints imposed by the packages are built into the tables 604, 608, 612.

Figure 6:
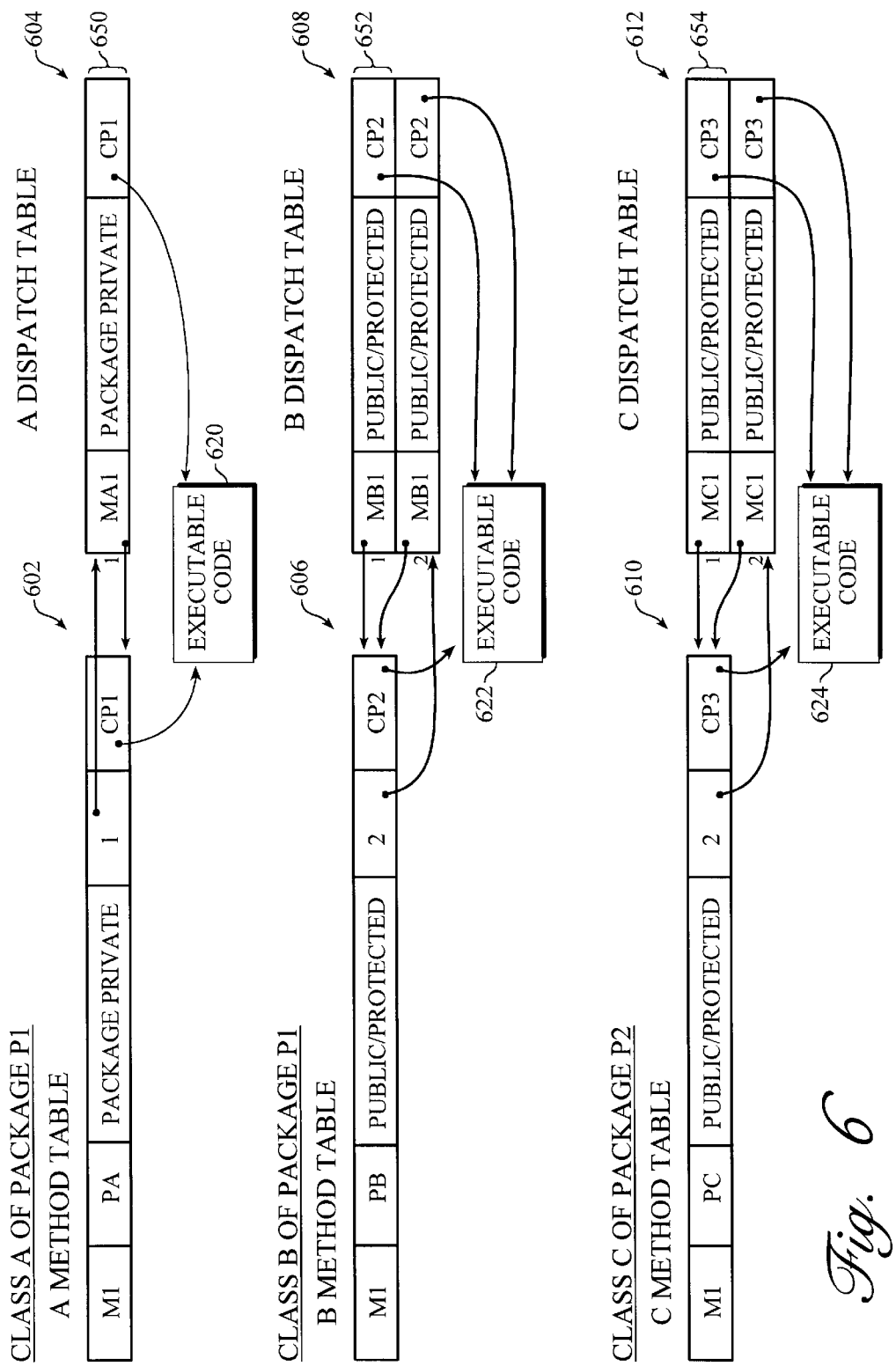
FIG. 6 shows sample dispatch tables constructed in accordance with the present invention for the classes shown in FIG. 2.

As shown in FIG. 6, there is an entry 650 in the A dispatch table 604 which corresponds to the method M1 in the A method table 602. This dispatch table entry 650 includes a package private marking (which it should since M1 of class A is package private, according to FIG. 2), and a code pointer CP1, which points to a set of executable code 620. Code 620 represents the implementation for method M1 provided by class A.

In the corresponding entry 652 (i.e. the entry having the same index) in the B dispatch table 608, note that the entry has been altered in two significant ways. First, there is a new pointer CP2 which points to a set of executable code 622 which is different from the code 620 provided by class A. By changing the pointer, class B is providing a different implementation for method M1 than that provided by class A. In effect, M1 of class B is overriding M1 of class A. This is the correct result because class B is in the same package as A, and hence, can access and override even package private methods of class A.

Second, note that the accessibility of the entry 652 has been changed from package private to public/protected. By doing so, the once package private method M1 of class A is made accessible and overridable to all subclasses of class B. It is this change that makes it possible to construct dispatch tables which enable transitive method override.

To continue with the example, in the corresponding entry 654 in the C dispatch table 612, note that a change has also been made. Specifically, there is a new pointer CP3 which points to a set of executable code 624 which is different from the code 620 provided by class A. By changing the pointer, class C is providing a different implementation for method M1 than that provided by class A. Thus, M1 of class C is overriding M1 of class A This is the correct result under the transitive property. Since method M1 of C can override method M1 of B, and method M1 of B can override method M1 of A, then method M1 of C can override method M1 of A. This is indeed the result achieved by the present invention. Thus, as this example shows, the method of the present invention produces dispatch tables which enable transitive method override.

Figure 7A:
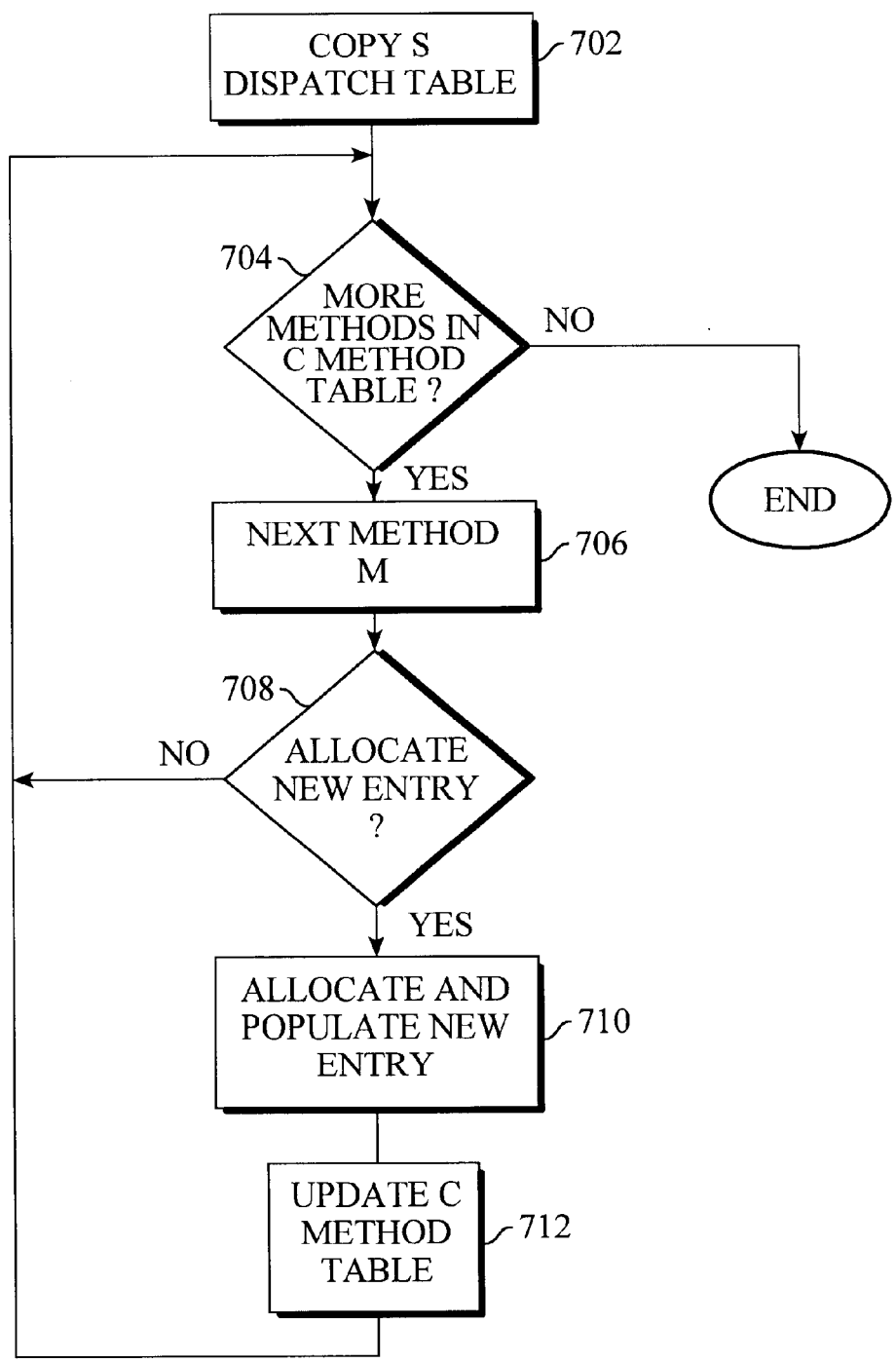
FIGS. 7a–7b are flow diagrams for an alternate embodiment of the present invention.
Figure 7B:
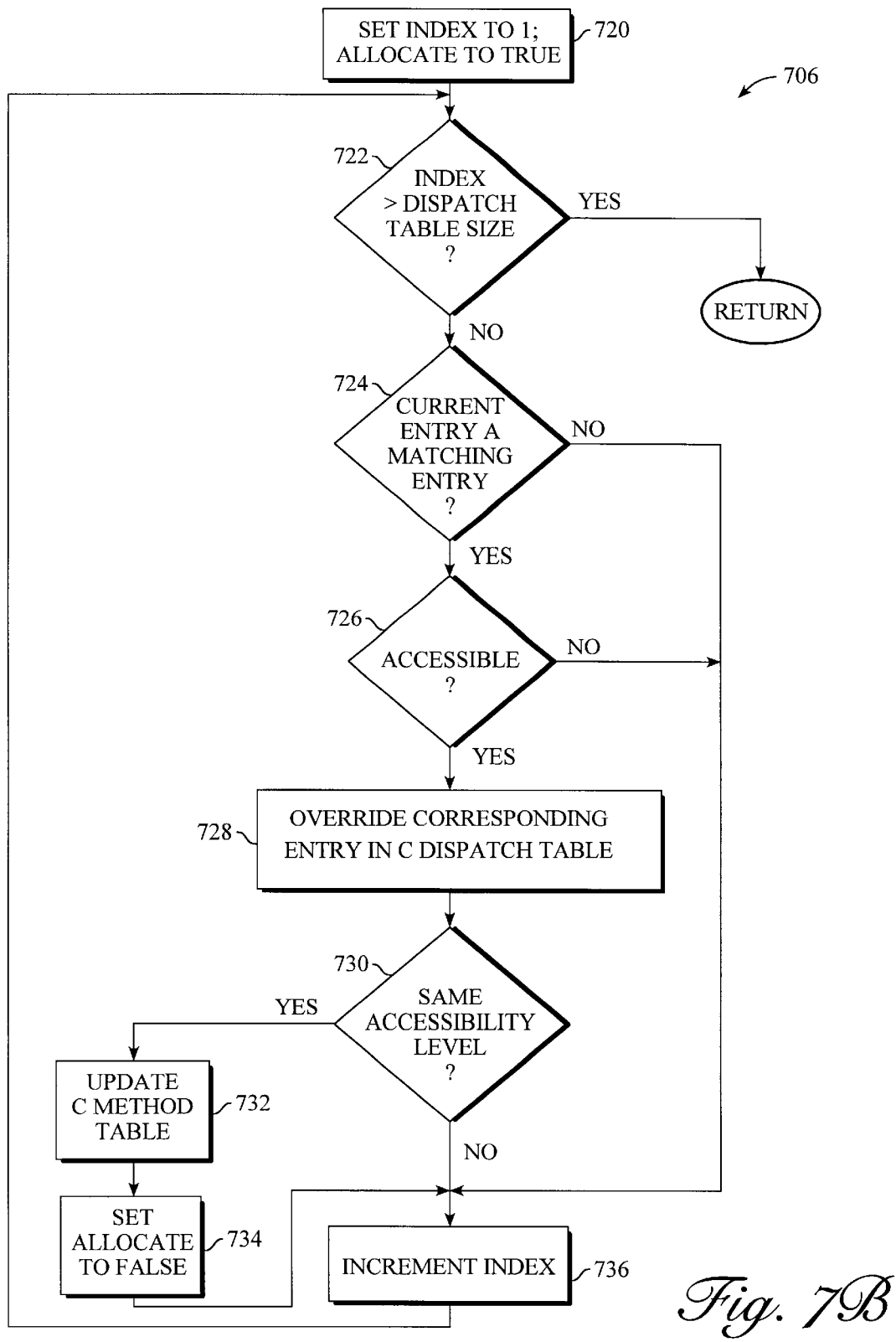

An alternative embodiment of the methodology of the present invention is shown in the flow diagrams of FIGS. 7a and 7b. Like the first embodiment, this embodiment produces dispatch tables which enable transitive method override. However, the manner of producing the tables is slightly different. The form of the tables produced is also slightly different. Specifically, the dispatch tables generated in accordance with this embodiment do not comprise an accessibility column. Although the alternate dispatch tables do not include an accessibility column, the sample tables of FIG. 4 will still be useful in describing the invention. The accessibility columns is 422, 462 will simply not be referenced. With reference to FIGS. 4 and 7a–7b, the alternative embodiment will now be described.

As shown in FIG. 7a, the dispatch table construction process begins with copying (702) the S dispatch table 404 and using it as the starting point for the C dispatch table 444. Once the S dispatch table 404 is copied, a determination (704) is made as to whether there are more methods in the C method table 442. If not, then the process terminates. However, if there are more methods in the C method table 442, then the next method m (e.g. entry 468) is selected (706). Thereafter, a determination (708) is made as to whether a new entry should be allocated in the C dispatch table 444 for the method m. In this embodiment, part of the allocation determination involves possible override of some entries. This determination process (708), which involves looping through each entry in the S dispatch table, is shown in greater detail in FIG. 7b.

Initially, an index variable is set (720) to 1, and an allocation variable is set to "True". The index variable indicates which entry in the S dispatch table 404 is the current entry. Once these variables are initialized, a determination (722) is made as to whether the index variable has a value greater than the size of the S dispatch table 404. If so, then it means that all of the entries in the S dispatch table 404 have been processed, in which case, the process returns to (708) of FIG. 7a. On the other hand, if the current index value is not greater than the size of the S dispatch table 404, then a determination (724) is made as to whether the current entry is a matching entry for method m. That is, does the current entry of the S dispatch table 404 correspond to a method in the S method table 402 having the same name as method m? If not, then the process proceeds to (736). However, if the current entry is a matching entry, then a determination (726) is made as to whether the method in the S method table 402 associated with the current entry is accessible to class C. The method is accessible to class C if: (1) the method is declared public/protected; or (2) the method is package private and S is in the same package P as C; or (3) the method is package private and S is not in the same package as C BUT an intervening class which can access the method directly or indirectly has declared the method to be public/protected. If none of these criteria are met, then the process proceeds to (736). However, if even one of these criteria is met, then the entry in the C dispatch table 444 corresponding to the current entry is overridden (728). For example, if the current entry is entry 426, then the corresponding entry 466 (the entry with the same index) in the C dispatch table 444 is overridden. The entry 466 is overridden by: (1) storing into the method pointer column 460 of the entry 466 a pointer pointing to the method m entry 468 of the C method table; and (2) storing into the code pointer column 464 of the entry 466 the code pointer found in the code pointer column 458 of the method m entry 468.

Once the corresponding entry in the C dispatch table 444 is overridden, a determination (730) is made as to whether the method m and the method in the S method table 402 corresponding to the current entry have the same accessibility level. They have the same accessibility level if: (1) they are both public/protected; (2) they are both package private to P; or (3) method m is declared public/protected and the method in the S method table 402 corresponding to the current entry has been publicized. If any one of these criteria is met, then the C method table 442 is updated (732) by writing the index of the newly overridden entry 466 into the dispatch table index column 456 of the method m entry 468. In addition, the allocate variable is set to "False". The process then proceeds to (736).

Returning to (730), if method m and the method in the S method table 402 corresponding to the current entry do not have the same accessibility level, then the process proceeds to (736) to increment the index variable, and to loop back to (722) to process the next entry in the S dispatch table 404. This process continues until all of the entries in the S dispatch table 404 have been processed, at which time, the process returns to (708) of FIG. 7a.

Once (708) has been carried out, it is known from the value of the allocate variable whether a new entry needs to be allocated in the C dispatch table 444. If a new entry is not needed, then the process loops back to (704) to process another method m in the C method table 442. However, if a new entry is needed, then a new entry 470 is allocated and populated (710). The new entry 470 is populated by: (1) storing a pointer in the method pointer column 460 of the entry 470 which points to the method m entry 468 of the C method table; and (2) storing the code pointer found in the code pointer column 458 of the method m entry 468 of the C method table 442 into the code pointer column 464 of the new entry 470. Thereafter, the C method table 442 is updated (712) by writing the index of the newly allocated entry 470 into the dispatch table index column 456 of the method m entry 468. Once that is done, the current method m 468 is fully processed; thus, the process loops back to (704) to process the next method m. This process continues until all of the methods in the C method table 442 have been processed.

To further disclose the present invention, a sample set of source code written in the C++ programming language is provided into CD-ROM. This source code provides one possible implementation for the alternate embodiment of the present invention.

HARDWARE OVERVIEW

Figure 8:
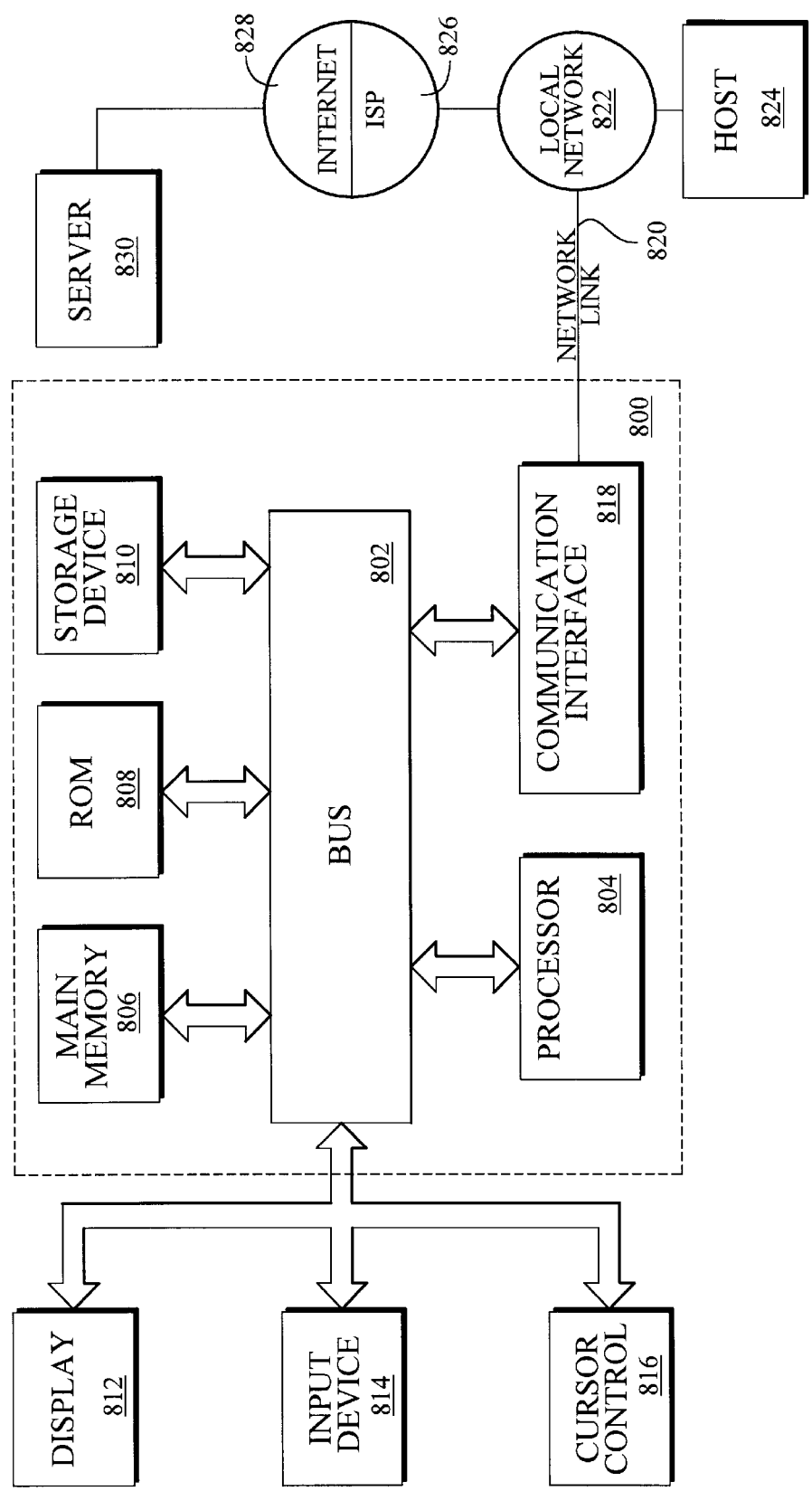
FIG. 8 is a hardware block diagram of a computer system in which an embodiment of the present invention may be implemented.

In one embodiment, the present invention is implemented as a set of instructions executable by one or more processors. The invention may be implemented as part of any object oriented programming system, including but not limited to the Java™ programming system manufactured by Sun Microsystems, Inc. of Mountain View, Calif. FIG. 8 shows a hardware block diagram of a computer system 800 in which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. In addition to being used to store the dispatch and method tables, main memory 806 may also be further used to store temporary variables or other intermediate information during execution of instructions by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

According to one embodiment, the functionality of the present invention is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 10 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented.

In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 100 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. In this manner, computer system 800 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer-implemented method for constructing a dispatch table for a class C, wherein the class C is within a modularity construct P and has a superclass S, the superclass S having an S dispatch table associated therewith, said method comprising:

replicating the S dispatch table to derive a C dispatch table for class C;

for a method m in class C which has been declared as being accessible by classes outside of modularity construct P, determining whether there is at least one matching entry in the S dispatch table which corresponds to a matching method of superclass S having the same name as method m;

in response to a determination that there is at least one matching entry in the S dispatch table, determining whether the matching entry is declared as being private to modularity construct P; and in response to a determination that the matching entry is declared as being private to modularity construct P, updating a corresponding entry in said C dispatch table which corresponds to the matching entry in the S dispatch table to declare said corresponding entry in said C dispatch table as being accessible by classes outside of modularity construct P;

wherein updating said corresponding entry of said C dispatch table causes said classes outside of modularity construct P to be able to transitively override said matching method of superclass S.

2. The method of claim 1, wherein the matching entry comprises a code pointer which points to a set of code, and wherein updating said corresponding entry in said C dispatch table comprises:

storing in said corresponding entry of said C dispatch table a new code pointer which points to a different set of code, thereby enabling said class C to provide a different implementation for said method m than that provided by the superclass S.

3. The method of claim 1, further comprising:

in response to a determination that there is at least one matching entry in the S dispatch table, determining whether any of the matching entries is declared as being generally accessible;

in response to a determination that any of the matching entries is declared as being generally accessible, selecting one of the matching entries which has been declared as being generally accessible to be a selected matching entry, the selected matching entry comprising a code pointer which points to a set of code; and updating a second corresponding entry in said C dispatch table which corresponds to the selected matching entry in the S dispatch table by storing in said second corresponding entry of said C dispatch table a new code pointer which points to a different set of code, thereby enabling said class C to provide a different implementation for said method m than that provided by the superclass S.

4. The method of claim 1, further comprising:

in response to a determination that there is at least one matching entry in the S dispatch table, determining whether any of the matching entries is declared as being generally accessible;

in response to a determination that none of the matching entries is declared as being generally accessible, allocating a new entry in said C dispatch table; and updating said new entry by declaring said new entry as being accessible by classes outside of modularity construct P, and by storing a new code pointer in said new entry.

5. A computer-implemented method for constructing a dispatch table for a class C, wherein the class C is within a modularity construct P and has a superclass S, the superclass S having an S dispatch table associated therewith, said method comprising:

replicating the S dispatch table to derive a C dispatch table for class C;

for a method m in class C, determining whether there is at least one matching entry in the S dispatch table which corresponds to a matching method of superclass S having the same name as method m;

in response to a determination that there is at least one matching entry in the S dispatch table, determining whether the matching method of superclass S which corresponds to the matching entry is accessible to class C, wherein the matching entry comprises a code pointer which points to a set of code, and wherein the matching method is determined to be accessible to class C if the matching method is private to a modularity construct other than modularity construct P and has been declared to be generally accessible by an intervening class which can access the matching method; and in response to a determination that the matching method is accessible to class C, updating a corresponding entry in said C dispatch table which corresponds to the matching entry in the S dispatch table by storing in said corresponding entry of said C dispatch table a new code pointer which points to a different set of code, thereby enabling said class C to provide a different implementation for said method m than that provided by the superclass S;

wherein storing in said corresponding entry of said C dispatch table said new code pointer which points to said different set of code causes classes outside of modularity construct P to be able to transitively override said matching method of superclass S.

6. The method of claim 5, wherein the matching method is further determined to be accessible to class C if:

the matching method is declared to be generally accessible; or superclass S is within modularity construct P.

7. The method of claim 5, further comprising:

determining whether a new entry is to be allocated in said C dispatch table;

in response to a determination that a new entry is to be allocated, allocating a new entry in said C dispatch table; and updating said new entry by storing said new code pointer in said new entry.

8. The method of claim 7, wherein determining whether a new entry is to be allocated in said C dispatch table comprises:

determining whether the matching method and method m have equivalent accessibility levels; and in response to a determination that the matching method and method m have equivalent accessibility levels, providing an indication that no new entry is to be allocated in said C dispatch table.

9. The method of claim 8, wherein the matching method and method m are determined to have equivalent accessibility levels if:

method m is declared to be generally accessible, and the matching method is private to a modularity construct other than modularity construct P but has been declared to be generally accessible by an intervening class which can access the matching method.

10. The method of claim 9, wherein the matching method and method m are further determined to have equivalent accessibility levels if:

both the matching method and method m are declared to be generally accessible; or both the matching method and method m are declared to be private to modularity construct P.

11. A computer-implemented method for constructing a dispatch table for a class C, wherein the class C is within a modularity construct P and has a superclass S, the superclass S having an S dispatch table associated therewith, said method comprising:

replicating the S dispatch table to derive a C dispatch table for class C;

for a method m in class C which has been declared as being private to modularity construct P, determining whether there is at least one matching entry in the S dispatch table which corresponds to a matching method of superclass S having the same name as method m;

in response to a determination that there is at least one matching entry in the S dispatch table, determining whether the matching entry, which comprises a code pointer which points to a set of code, is declared as being generally accessible; and in response to a determination that the matching entry is declared as being generally accessible, updating a corresponding entry in said C dispatch table which corresponds to the matching entry in the S dispatch table by storing in said corresponding entry of said C dispatch table a new code pointer which points to a different set of code, thereby enabling said class C to provide a different implementation for said method m than that provided by the superclass S;

wherein updating said corresponding entry in said C dispatch table comprises declaring said corresponding entry in said C dispatch table as being accessible by classes outside of modularity construct P; and wherein declaring said corresponding entry in said C dispatch table as being accessible by classes outside of modularity construct P causes said classes outside of modularity construct P to be able to transitively override said matching method of superclass S.

12. The method of claim 11, further comprising:

in response to a determination that there is at least one matching entry in the S dispatch table, determining whether any of the matching entries is declared as being private to modularity construct P;

in response to a determination that any of the matching entries is declared as being private to modularity construct P, selecting one of the matching entries which has been declared as being private to modularity construct P to be a selected matching entry, the selected matching entry comprising a second code pointer which points to a second set of code; and updating a second corresponding entry in said C dispatch table which corresponds to the selected matching entry in the S dispatch table by storing in said second corresponding entry of said C dispatch table said new code pointer which points to said different set of code, thereby enabling said class C to provide a different implementation for said method m than that provided by the superclass S.

13. The method of claim 11, further comprising:

in response to a determination that there is at least one matching entry in the S dispatch table, determining whether any of the matching entries is declared as private to modularity construct P;

in response to a determination that none of the matching entries is declared as being private to modularity construct P, allocating a new entry in said C dispatch table; and updating said new entry by declaring said new entry as being private to modularity construct P, and storing said new code pointer in said new entry.

14. An apparatus for constructing a dispatch table for a class C, wherein the class C is within a modularity construct P and has a superclass S, the superclass S having an S dispatch table associated therewith, said apparatus comprising:

a mechanism for replicating the S dispatch table to derive a C dispatch table for class C;

a mechanism for determining, for a method m in class C which has been declared as being accessible by classes outside of modularity construct P, whether there is at least one matching entry in the S dispatch table which corresponds to a matching method of superclass S having the same name as method m;

a mechanism for determining, in response to a determination that there is at least one matching entry in the S dispatch table, whether the matching entry is declared as being private to modularity construct P; and a mechanism for updating, in response to a determination that the matching entry is declared as being private to modularity construct P, a corresponding entry in said C dispatch table which corresponds to the matching entry in the S dispatch table to declare said corresponding entry in said C dispatch table as being accessible by classes outside of modularity construct P;

wherein updating said corresponding entry of said C dispatch table causes said classes outside of modularity construct P to be able to transitively override said matching method of superclass S.

15. The apparatus of claim 14, wherein the matching entry comprises a code pointer which points to a set of code, and wherein the mechanism for updating said corresponding entry in said C dispatch table comprises:

a mechanism for storing in said corresponding entry of said C dispatch table a new code pointer which points to a different set of code, thereby enabling said class C to provide a different implementation for said method m than that provided by the superclass S.

16. The apparatus of claim 14, further comprising:

a mechanism for determining, in response to a determination that there is at least one matching entry in the S dispatch table, whether any of the matching entries is declared as being generally accessible;

a mechanism for selecting, in response to a determination that any of the matching entries is declared as being generally accessible, one of the matching entries which has been declared as being generally accessible to be a selected matching entry, the selected matching entry comprising a code pointer which points to a set of code; and a mechanism for updating a second corresponding entry in said C dispatch table which corresponds to the selected matching entry in the S dispatch table by storing in said second corresponding entry of said C dispatch table a new code pointer which points to a different set of code, thereby enabling said class C to provide a different implementation for said method m than that provided by the superclass S.

17. The apparatus of claim 14, further comprising:

a mechanism for determining, in response to a determination that there is at least one matching entry in the S dispatch table, whether any of the matching entries is declared as being generally accessible;

a mechanism for allocating, in response to a determination that none of the matching entries is declared as being generally accessible, a new entry in said C dispatch table; and a mechanism for updating said new entry by declaring said new entry as being accessible by classes outside of modularity construct P, and by storing a new code pointer in said new entry.

18. An apparatus for constructing a dispatch table for a class C, wherein the class C is within a modularity construct P and has a superclass S, the superclass S having an S dispatch table associated therewith, said apparatus comprising:

a mechanism for replicating the S dispatch table to derive a C dispatch table for class C;

a mechanism for determining, for a method m in class C which has been declared as being private to modularity construct P, whether there is at least one matching entry in the S dispatch table which corresponds to a matching method of superclass S having the same name as method m;

a mechanism for determining, in response to a determination that there is at least one matching entry in the S dispatch table, whether the matching entry, which comprises a code pointer which points to a set of code, is declared as being generally accessible; and a mechanism for updating, in response to a determination that the matching entry is declared as being generally accessible, a corresponding entry in said C dispatch table which corresponds to the matching entry in the S dispatch table by storing in said corresponding entry of said C dispatch table a new code pointer which points to a different set of code, thereby enabling said class C to provide a different implementation for said method m than that provided by the superclass S;

wherein the mechanism for updating said corresponding entry in said C dispatch table comprises a mechanism for declaring said corresponding entry in said C dispatch table as being accessible by classes outside of modularity construct P; and wherein declaring said corresponding entry in said C dispatch table as being accessible by classes outside of modularity construct P causes said classes outside of modularity construct P to be able to transitively override said matching method of superclass S.

19. The apparatus of claim 18, further comprising:

a mechanism for determining, in response to a determination that there is at least one matching entry in the S dispatch table, whether any of the matching entries is declared as private to modularity construct P;

a mechanism for allocating, in response to a determination that none of the matching entries is declared as being private to modularity construct P, a new entry in said C dispatch table; and a mechanism for updating said new entry by declaring said new entry as being private to modularity construct P, and storing said new code pointer in said new entry.

20. The apparatus of claim 18, further comprising:

a mechanism for determining, in response to a determination that there is at least one matching entry in the S dispatch table, whether any of the matching entries is declared as being private to modularity construct P;

a mechanism for selecting, in response to a determination that any of the matching entries is declared as being private to modularity construct P, one of the matching entries which has been declared as being private to modularity construct P to be a selected matching entry, the selected matching entry comprising a second code pointer which points to a second set of code; and a mechanism for updating a second corresponding entry in said C dispatch table which corresponds to the selected matching entry in the S dispatch table by storing in said second corresponding entry of said C dispatch table said new code pointer which points to said different set of code, thereby enabling said class C to provide a different implementation for said method m than that provided by the superclass S.

21. An apparatus for constructing a dispatch table for a class C, wherein the class C is within a modularity construct P and has a superclass S, the superclass S having an S dispatch table associated therewith, said apparatus comprising:

a mechanism for replicating the S dispatch table to derive a C dispatch table for class C;

a mechanism for determining, for a method m in class C, whether there is at least one matching entry in the S dispatch table which corresponds to a matching method of superclass S having the same name as method m;

a mechanism for determining, in response to a determination that there is at least one matching entry in the S dispatch table, whether the matching method of superclass S which corresponds to the matching entry is accessible to class C, wherein the matching entry comprises a code pointer which points to a set of code, and wherein the matching method is determined to be accessible to class C if the matching method is private to a modularity construct other than modularity construct P and has been declared to be generally accessible by an intervening class which can access the matching method; and a mechanism for updating, in response to a determination that the matching method is accessible to class C, a corresponding entry in said C dispatch table which corresponds to the matching entry in the S dispatch table by storing in said corresponding entry of said C dispatch table a new code pointer which points to a different set of code, thereby enabling said class C to provide a different implementation for said method m than that provided by the superclass S;

wherein storing in said corresponding entry of said C dispatch table said new code pointer which points to said different set of code causes classes outside of modularity construct P to be able to transitively override said matching method of superclass S.

22. The apparatus of claim 21, wherein the matching method is further determined to be accessible to class C if:

the matching method is declared to be generally accessible; or superclass S is within modularity construct P.

23. The apparatus of claim 21, further comprising:

a mechanism for determining whether a new entry is to be allocated in said C dispatch table;

a mechanism for allocating, in response to a determination that a new entry is to be allocated, a new entry in said C dispatch table; and a mechanism for updating said new entry by storing said new code pointer in said new entry.

24. The apparatus of claim 23, wherein the mechanism for determining whether a new entry is to be allocated in said C dispatch table comprises:

a mechanism for determining whether the matching method and method m have equivalent accessibility levels; and a mechanism for providing, in response to a determination that the matching method and method m have equivalent accessibility levels, an indication that no new entry is to be allocated in said C dispatch table.

25. The apparatus of claim 24, wherein the matching method and method m are determined to have equivalent accessibility levels if:

method m is declared to be generally accessible, and the matching method is private to a modularity construct other than modularity construct P but has been declared to be generally accessible by an intervening class which can access the matching method.

26. The apparatus of claim 25, wherein the matching method and method m are further determined to have equivalent accessibility levels if:

both the matching method and method m are declared to be generally accessible; or both the matching method and method m are declared to be private to modularity construct P.

27. A computer-readable medium having stored thereon instructions which, when executed by one or more processors, cause the one or more processors to construct a dispatch table for a class C, wherein the class C is within a modularity construct P and has a superclass S, the superclass S having an S dispatch table associated therewith, said computer readable medium comprising:

instructions for causing one or more processors to replicate the S dispatch table to derive a C dispatch table for class C;

instructions for causing one or more processors to determine, for a method m in class C which has been declared as being accessible by classes outside of modularity construct P, whether there is at least one matching entry in the S dispatch table which corresponds to a matching method of superclass S having the same name as method m;

instructions for causing one or more processors to determine, in response to a determination that there is at least one matching entry in the S dispatch table, whether the matching entry is declared as being private to modularity construct P; and instructions for causing one or more processors to update, in response to a determination that the matching entry is declared as being private to modularity construct P, a corresponding entry in said C dispatch table which corresponds to the matching entry in the S dispatch table to declare said corresponding entry in said C dispatch table as being accessible by classes outside of modularity construct P;

wherein updating said corresponding entry of said C dispatch table causes said classes outside of modularity construct P to be able to transitively override said matching method of superclass S.

28. The computer-readable medium of claim 27, wherein the matching entry comprises a code pointer which points to a set of code, and wherein the instructions for causing one or more processors to update said corresponding entry in said C dispatch table comprises:

instructions for causing one or more processors to store in said corresponding entry of said C dispatch table a new code pointer which points to a different set of code, thereby enabling said class C to provide a different implementation for said method m than that provided by the superclass S.

29. The computer-readable medium of claim 27, further comprising:

instructions for causing one or more processors to determine, in response to a determination that there is at least one matching entry in the S dispatch table, whether any of the matching entries is declared as being generally accessible;

instructions for causing one or more processors to select, in response to a determination that any of the matching entries is declared as being generally accessible, one of the matching entries which has been declared as being generally accessible to be a selected matching entry, the selected matching entry comprising a code pointer which points to a set of code; and instructions for causing one or more processors to update a second corresponding entry in said C dispatch table which corresponds to the selected matching entry in the S dispatch table by storing in said second corresponding entry of said C dispatch table a new code pointer which points to a different set of code, thereby enabling said class C to provide a different implementation for said method m than that provided by the superclass S.

30. The computer-readable medium of claim 27, further comprising:
instructions for causing one or more processors to determine, in response to a determination that there is at least one matching entry in the S dispatch table, whether any of the matching entries is declared as being generally accessible;
instructions for causing one or more processors to allocate, in response to a determination that none of the matching entries is declared as being generally accessible, a new entry in said C dispatch table; and
instructions for causing one or more processors to update said new entry by declaring said new entry as being accessible by classes outside of modularity construct P, and by storing a new code pointer in said new entry.

31. A computer-readable medium having stored thereon instructions which, when executed by one or more processors, cause the one or more processors to construct a dispatch table for a class C, wherein the class C is within a modularity construct P and has a superclass S, the superclass S having an S dispatch table associated therewith, said computer readable medium comprising:
instructions for causing one or more processors to replicate the S dispatch table to derive a C dispatch table for class C;
instructions for causing one or more processors to determine, for a method m in class C which has been declared as being private to modularity construct P, whether there is at least one matching entry in the S dispatch table which corresponds to a matching method of superclass S having the same name as method m;
instructions for causing one or more processors to determine, in response to a determination that there is at least one matching entry in the S dispatch table, whether the matching entry, which comprises a code pointer which points to a set of code, is declared as being generally accessible; and
instructions for causing one or more processors to update, in response to a determination that the matching entry is declared as being generally accessible, a corresponding entry in said C dispatch table which corresponds to the matching entry in the S dispatch table by storing in said corresponding entry of said C dispatch table a new code pointer which points to a different set of code, thereby enabling said class C to provide a different implementation for said method m than that provided by the superclass S;
wherein the instructions for causing one or more processors to update said corresponding entry in said C dispatch table comprise instructions for causing one or more processors to declare said corresponding entry in said C dispatch table as being accessible by classes outside of modularity construct P; and
wherein declaring said corresponding entry in said C dispatch table as being accessible by classes outside of modularity construct P causes said classes outside of modularity construct P to be able to transitively override said matching method of superclass S.

32. The computer-readable medium of claim 31, further comprising:
instructions for causing one or more processors to determine, in response to a determination that there is at least one matching entry in the S dispatch table, whether any of the matching entries is declared as being private to modularity construct P;
instructions for causing one or more processors to select, in response to a determination that any of the matching entries is declared as being private to modularity construct P, one of the matching entries which has been declared as being private to modularity construct P to be a selected matching entry, the selected matching entry comprising a second code pointer which points to a second set of code; and
instructions for causing one or more processors to update a second corresponding entry in said C dispatch table which corresponds to the selected matching entry in the S dispatch table by storing in said second corresponding entry of said C dispatch table said new code pointer which points to said different set of code, thereby enabling said class C to provide a different implementation for said method m than that provided by the superclass S.

33. The computer-readable medium of claim 31, further comprising:
instructions for causing one or more processors to determine, in response to a determination that there is at least one matching entry in the S dispatch table, whether any of the matching entries is declared as private to modularity construct P;
instructions for causing one or more processors to allocate, in response to a determination that none of the matching entries is declared as being private to modularity construct P, a new entry in said C dispatch table; and
instructions for causing one or more processors to update said new entry by declaring said new entry as being private to modularity construct P, and storing said new code pointer in said new entry.

34. A computer-readable medium having stored thereon instructions which, when executed by one or more processors, cause the one or more processors to construct a dispatch table for a class C, wherein the class C is within a modularity construct P and has a superclass S, the superclass S having an S dispatch table associated therewith, said computer readable medium comprising:
instructions for causing one or more processors to replicate the S dispatch table to derive a C dispatch table for class C;
instructions for causing one or more processors to determine, for a method m in class C, whether there is at least one matching entry in the S dispatch table which corresponds to a matching method of superclass S having the same name as method m;
instructions for causing one or more processors to determine, in response to a determination that there is at least one matching entry in the S dispatch table, whether the matching method of superclass S which corresponds to the matching entry is accessible to class C, wherein the matching entry comprises a code pointer which points to a set of code, and wherein the matching method is determined to be accessible to class C if the matching method is private to a modularity construct other than modularity construct P and has been declared to be generally accessible by an intervening class which can access the matching method; and
instructions for causing one or more processors to update, in response to a determination that the matching method is accessible to class C, a corresponding entry in said C dispatch table which corresponds to the matching entry in the S dispatch table by storing in said corresponding entry of said C dispatch table a new code pointer which points to a different set of code, thereby enabling said class C to provide a different implementation for said method m than that provided by the superclass S;

wherein storing in said corresponding entry of said C dispatch table said new code pointer which points to said different set of code causes classes outside of modularity construct P to be able to transitively override said matching method of superclass S.

35. The computer-readable medium of claim 34, wherein the matching method is further determined to be accessible to class C if:

the matching method is declared to be generally accessible; or superclass S is within modularity construct P.

36. The computer-readable medium of claim 34, further comprising:

instructions for causing one or more processors to determine whether a new entry is to be allocated in said C dispatch table;

instructions for causing one or more processors to allocate, in response to a determination that a new entry is to be allocated, a new entry in said C dispatch table; and instructions for causing one or more processors to update said new entry by storing said new code pointer in said new entry.

37. The computer-readable medium of claim 36, wherein the instructions for causing one or more processors to determine whether a new entry is to be allocated in said C dispatch table comprises:

instructions for causing one or more processors to determine whether the matching method and method m have equivalent accessibility levels; and instructions for causing one or more processors to provide, in response to a determination that the matching method and method m have equivalent accessibility levels, an indication that no new entry is to be allocated in said C dispatch table.

38. The computer-readable medium of claim 37, wherein the matching method and method m are determined to have equivalent accessibility levels if:

method m is declared to be generally accessible, and the matching method is private to a modularity construct other than modularity construct P but has been declared to be generally accessible by an intervening class which can access the matching method.

39. The computer-readable medium of claim 38, wherein the matching method and method m are further determined to have equivalent accessibility levels if:

both the matching method and method m are declared to be generally accessible; or both the matching method and method m are declared to be private to modularity construct P.

\* \* \* \* \*